(12) United States Patent  
Gaulke et al.

(10) Patent No.: US 10,807,581 B2  
(45) Date of Patent: Oct. 20, 2020

(54) DRIVER BRAKE VALVE, COMPRESSED-AIR BRAKE SYSTEM HAVING THE DRIVER BRAKE VALVE, AND METHOD FOR PRODUCING THE DRIVER BRAKE VALVE

(71) Applicant: WABCO Europe BVBA, Brussels (BE)

(72) Inventors: Arnd Gaulke, Wennigsen (DE); Torsten Wallbaum, Duingen (DE)

(73) Assignee: WABCO EUROPE BVBA, Brussels (BE)

( * ) Notice: Subject to any disclaimer, the term of this patent is extended or adjusted under 35 U.S.C. 154(b) by 64 days.

(21) Appl. No.: 16/084,558

(22) PCT Filed: Mar. 6, 2017

(86) PCT No.: PCT/EP2017/000299  
§ 371 (c)(1),  
(2) Date: Sep. 13, 2018

(87) PCT Pub. No.: WO2017/182113  
PCT Pub. Date: Oct. 26, 2017

(65) Prior Publication Data  
US 2019/0023250 A1   Jan. 24, 2019

(30) Foreign Application Priority Data

Apr. 18, 2016   (DE) .................. 10 2016 004 489

(51) Int. Cl.
- *B60T 15/14*   (2006.01)
- *B60T 7/04*   (2006.01)
- *B60T 8/32*   (2006.01)

(52) U.S. Cl.  
CPC .............. *B60T 15/14* (2013.01); *B60T 7/042* (2013.01); *B60T 8/327* (2013.01)

(58) Field of Classification Search  
CPC .......... B60T 7/042; B60T 8/327; B60T 15/14; B60T 7/04; B60T 8/32  
(Continued)

(56) References Cited

U.S. PATENT DOCUMENTS 6,354,671 B1 *   3/2002   Feldmann ............... B60T 7/042  
303/15  
6,367,889 B1   4/2002   Tsubouchi et al.  
(Continued)

FOREIGN PATENT DOCUMENTS

DE   10046617 A1   4/2001  
DE   10341027 A1   3/2004  
(Continued)

*Primary Examiner* — Robert A. Siconolfi  
*Assistant Examiner* — San M Aung  
(74) *Attorney, Agent, or Firm* — Leydig, Voit & Mayer, Ltd.

(57) ABSTRACT

A driver brake valve for a compressed air brake system of a commercial vehicle is configured to be controlled by a brake pedal and is further configured to output an analog driver braking pressure and an electrical sensor desired signal in dependence upon the actuation of the brake pedal. The driver brake valve includes a compressed air input configured to connect to a system pressure, a compressed air output configured to connect to a brake control line, a sensor configured to determine an actuation of the brake pedal, a characteristic curve storage device configured to store characteristic curve data, and a determining device. The sensor is configured to generate an actuating signal in dependence upon the actuation of the brake pedal. The determining device is configured to generate a sensor desired signal from the actuating signal in dependence upon the characteristic curve data.

20 Claims, 4 Drawing Sheets

(58) Field of Classification Search
USPC ...... 303/113.1, 113.4, 114.3; 701/34.4, 32.1, 701/70, 78
See application file for complete search history.

(56) References Cited

U.S. PATENT DOCUMENTS

| | | | |
|---|---|---|---|
| 6,648,427 B1* | 11/2003 | Wuerth | B60T 7/042 |
| | | | 303/113.4 |
| 2012/0310502 A1* | 12/2012 | Garbe | B60T 8/3255 |
| | | | 701/70 |
| 2013/0320751 A1* | 12/2013 | Eberling | B60T 13/662 |
| | | | 303/14 |
| 2015/0046056 A1* | 2/2015 | Schreiter | B60T 8/17 |
| | | | 701/78 |
| 2015/0066321 A1* | 3/2015 | Brubaker | B60T 13/662 |
| | | | 701/70 |

FOREIGN PATENT DOCUMENTS

| | | |
|---|---|---|
| DE | 102007018515 A1 | 10/2008 |
| DE | 102012003106 B3 | 3/2013 |
| GB | 2489086 A | 9/2012 |
| WO | WO 2015030865 A1 | 3/2015 |

\* cited by examiner

DRIVER BRAKE VALVE, COMPRESSED-AIR BRAKE SYSTEM HAVING THE DRIVER BRAKE VALVE, AND METHOD FOR PRODUCING THE DRIVER BRAKE VALVE

CROSS REFERENCE TO RELATED APPLICATIONS

This application is a U.S. National Stage Application under 35 U.S.C. § 371 of International Application No. PCT/EP2017/000299 filed on Mar. 6, 2017, and claims benefit to German Patent Application No. DE 10 2016 004 489.6 filed on Apr. 18, 2016. The International Application was published in German on Oct. 26, 2017 as WO 2017/182113 A1 under PCT Article 21(2).

FIELD

The invention relates to a driver brake valve, a compressed air brake system having the driver brake valve and a method for producing or for calibrating the driver brake valve.

BACKGROUND

In the case of compressed air brake systems for commercial vehicles, different systems are known in order to relay to the wheel brakes a braking request that is input by the driver via his brake pedal. In the case of analog compressed air brake systems, a driver brake valve is actuated by means of the brake pedal via an actuating member, for example an actuating rod that is adjusted by means of the brake pedal, and said driver brake valve is connected to a reservoir pressure or system pressure and in dependence upon the actuation relays an analog braking pressure control value via a braking pressure control line to a braking circuit. Consequently, an analog braking pressure is generated directly by means of the brake pedal actuation and said braking pressure is then subsequently relayed to the wheel brakes by way of example via relay valves for amplifying the force and an ABS valve device of an anti-lock brake system. Systems of this type are characterized by a high degree of reliability. The braking pressure that is provided by the brake valve in a controlled manner may in addition be measured by means of a pressure sensor so that for example the driver braking pressure (pre-control pressure) that prevails at the ABS valve device is known and the pulsing of the ABS blocking valves may be performed with the knowledge of the prevailing driver braking pressure.

Furthermore, driver assist systems such as for example an ACC (automatic cruise control) for regulating the distance with respect to one or multiple vehicles ahead, and also systems for avoiding or reducing the severity of rear-end collisions by means of automatically engaging the brake (AEBS) are known and said systems as external systems output a so-called external braking request signal or XBR signal to the brake control device; but also the brake control device itself may output brake system internal control signals so as to activate the wheel brakes, in particular for electronic stability programs for avoiding vehicle instability (ESP, ESC) by means of automatically, selectively engaging the brake (RSC braking procedures). A braking procedure is requested at suitable wheel brakes by means of an external XBR signal or a brake system internal braking signal without the need for the driver to actuate the brake pedal. A system pressure or reservoir pressure is connected via a connecting valve device to a brake line for such an external braking procedure (XBR braking procedure) or internal RSC braking procedure and for example is driven in a fully output, periodic or pulsed manner to the wheel brakes by means of the ABS valve device in order to provide an appropriate braking effect. It is also useful for driver assist systems of this type or for their assistance in brake systems to know the braking pressure that is prevailing during the driver braking procedures so that a sufficient regulating accuracy inter alia may also be achieved when braking and also abrupt transitions from the hitherto prevailing driver braking pressure may be avoided during switching procedures.

Furthermore, in addition to analog compressed air brake systems, electronic compressed air brake systems are known in which the pedal actuation of the brake pedal is electrically sensed by means of a brake encoder, as a consequence without the need—as in the case of a brake valve—to relay to the wheel brakes an analog braking pressure control value via a connected pneumatic duct. In the case of such non-analog, electronic brake systems a braking effect is consequently directly generated at the wheel brakes from a system pressure, wherein the sensor signal of the brake encoder is drawn upon as a desired delay value or braking force request by the driver so as to provide a braking pressure at the wheel brakes in a controlled manner. In the case of such electronic brake systems, the connection of external braking request signals (XBR signals) is relatively simple since said signals may be drawn upon in a corresponding manner such as a driver braking request in order to provide the braking pressure at the wheel brakes in a controlled manner. However, in the case of electronic brake systems it is necessary in part for safety reasons to provide a pneumatic fall-back level.

DE 10 2012 003 106 B3 describes a method for determining a braking pressure value with reference to characteristic curves in which an electrical duct of the brake valve or brake encoder is allocated an electrical sensor and electrical signals are generated by means of said electrical sensor in dependence upon actuations of the brake encoder and said electrical signals represent the actuation that has occurred. Initially, a first characteristic curve is determined herein and stored, and the dependency of the electrical signals that are output in a controlled manner by the electrical sensor upon the degree of actuation of the brake encoder is represented in said characteristic curve and furthermore a second characteristic curve is determined and stored that represents the dependency of the braking pressure value that is provided in a controlled manner by the pneumatic duct upon the electrical signals of the electrical sensor. In the case of a braking request by means of actuating the brake encoder, the corresponding braking pressure value may be determined with the aid of the characteristic curves.

SUMMARY

In an embodiment, the present invention provides a driver brake valve for a compressed air brake system of a commercial vehicle, wherein the driver brake valve is configured to be controlled by a brake pedal and is further configured to output an analog driver braking pressure and an electrical sensor desired signal in dependence upon the actuation of the brake pedal. The driver brake valve includes a compressed air input configured to connect to a system pressure, a compressed air output configured to connect to a brake control line, a sensor configured to determine an actuation of the brake pedal, a characteristic curve storage device configured to store characteristic curve data, and a determining device. The sensor is configured to generate an actuating signal in dependence upon the actuation of the brake pedal. The determining device is configured to generate a sensor desired signal from the actuating signal in dependence upon the characteristic curve data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Brake pedal actuation can be evaluated as a request for a specific braking pressure with the aid of the characteristic curves that are stored in the brake control device without the use of a braking pressure sensor in order to provide a corresponding braking procedure in a controlled manner. Costs can be saved whilst nevertheless improving safety by means of omitting a braking pressure sensor for determining the ABS pre-pressure.

Embodiments of the invention provide a driver brake valve for a compressed air brake system, a compressed air brake system of this type and a method for producing the driver brake valve that render it possible to provide a safe compressed air brake system having low production and/or maintenance costs.

Embodiments of the invention provide driver brake valves, compressed air brake valves having a driver brake valve, and methods for producing a driver brake valve.

When a characteristic curve is already stored in a brake valve, a brake pedal actuation can be evaluated or converted by means of a determining device of the brake valve on the basis of said characteristic curve. The mechanical brake pedal actuation by the driver is consequently received preferably via the adjustment of an actuating member, for example an actuating rod, that is measured by means of a sensor that generates an electrical actuating signal in dependence upon the actuation. The sensor may be for example a travel sensor or Hall sensor that generates an electrical actuating signal that reproduces the adjustment travel of the actuating member.

However, the actuating signal that is directly determined in this manner is not directly output as a sensor signal to the brake control device but rather is processed or converted by means of a determining device and the at least one stored characteristic curve, wherein the characteristic curve includes a pressure dependency of the brake valve, said pressure dependency being determined in advance in a calibrating procedure. Consequently, a sensor signal may be output that takes into account the specific behavior of precisely this brake valve, for example its spring rigidity, the actual throughflow cross sections for the compressed air in dependence upon the actuation etc.

The characteristic curve is advantageously already determined during the production of the brake valve in that, in a calibrating device, the actuating member or an actuator of the calibrating device travels over different adjustment travels, wherein a pneumatic system pressure is connected to the compressed air input of the brake valve and a measurement is taken of the analog pressure value that is provided in a controlled manner at its pneumatic duct by means of the brake valve in the case of different adjustment travels. Consequently, initially a pressure adjustment travel characteristic curve or pressure actuating signal characteristic curve is generated that reproduces or includes the pressure characteristic of the brake valve. This data or a characteristic curve that is determined from these measurements is then stored in a storage device of the brake valve as a characteristic curve that consequently individually or specifically reproduces the characteristics of this brake valve.

Constructively identical brake valves may also comprise different characteristic curves or pressure adjustment travel characteristic curves owing to production dependent tolerances, wherein the characteristic curves in particular may be displaced with respect to one another, which in the case of relatively steep characteristic curve regions may lead to clear deviations. Whilst the calibrated characteristic curve feature is already drawn upon in the brake valve, an electrical sensor signal may consequently be output that is uniform and standardized. Brake valves may consequently be replaced without further outlay. It is also possible to replace the brake valve with a constructively similar device that has been calibrated in a similar manner.

The brake valve is herein the unit that is actuated by means of the brake pedal or an actuating rod of the brake pedal and in dependence upon the actuation on the one hand transmits in a controlled manner a system pressure that is connected, for example of a compressed air storage device or reservoir, as an analog driver braking pressure and on the other hand outputs an electrical sensor signal that is received by the brake control device. Consequently, an analog pneumatic duct and an electrical duct branch off from the brake valve, wherein the electrical signal may be communicated for example via a vehicle internal or brake system internal data bus (CAN bus) to the brake control device or for example as a pulse width modulated electrical signal.

Unlike for example in DE 10 2012 003 106 B3, the characteristic curve is not stored in the brake control device or a connected storage unit but rather is already stored in the brake valve that is pneumatically and electrically connected in the compressed air brake system. Consequently, the advantage of an increased variability and possibility of replacing individual components is achieved; also different, principally structurally similar brake valves may be directly inserted in a brake system without the need for this purpose for example initially to program a storage device of the control device accordingly.

The calibrating procedure may still be performed in particular during the production or at the end of the production of the brake valve during the final tightness and functionality testing. The brake valve is in any case tested during the end testing procedure for example for tightness and pressure characteristic, wherein said brake valve is connected to a system pressure using the compressed air input of said brake valve and the tightness of the compressed air input and the compressed air output thereof is tested. The calibrating procedure may be performed subsequently or during this testing procedure in that a series of actuating travels (adjustment travels) is performed by means of for example an actuator and the analog pneumatic pressure value that is controlled and output at the pressure output is determined by a pressure sensor. Consequently, a pressure-oriented calibrating procedure of the brake valve is performed using little outlay in an individual manner and a manner specific to the brake valve and the internal storage device of said brake valve may subsequently be programmed using the characteristic curve data for the later conversion.

In accordance with one embodiment, the possibility of a redundant measurement is provided in that the brake valve comprises two travel sensors that are provided independently of one another and that perform measurements, said travel sensors in each case measuring the adjustment travel of the actuating member separately, wherein the actuating signals of said travel sensors may subsequently be processed owing to their individual characteristic curves with the result that two sensor signals are output, in other words that the brake valve comprises two electrical ducts to the brake control device. Even in the event of a failure or malfunctions of an electrical duct or of a sensor, a redundancy is consequently provided by means of the further sensor and the further electrical duct without for example a pressure sensor being required.

In accordance with embodiments of the invention, a high degree of accuracy of the derived valve output pressure that is caused by the driver may consequently be achieved.

Figures 1, 2:
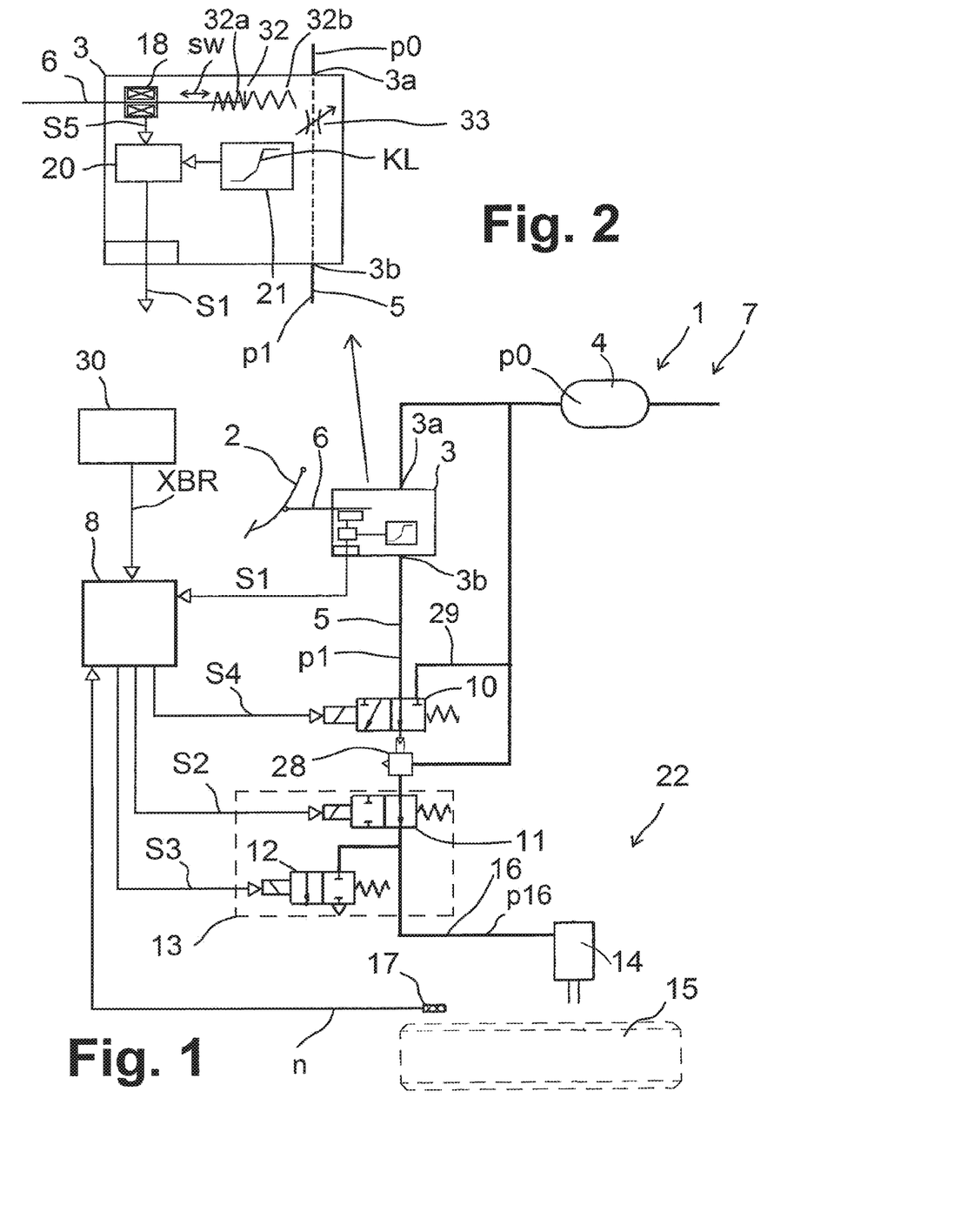
FIG. 1 illustrates an electro-pneumatic circuit diagram of a compressed air brake system in accordance with an embodiment.
FIG. 2 illustrates an enlarged view of the brake valve in FIG. 1.

A compressed air brake system 1 of a commercial vehicle 7 is illustrated in FIG. 1 having a braking circuit 22; in general, multiple braking circuits 22 are provided. The driver actuates a brake pedal 2 and as a consequence a brake valve 3 that receives compressed air at a system pressure p0 from a first compressed air reservoir 4 via the compressed air input 3a of said brake valve and transmits said compressed air via the compressed air output 3b of said brake valve in a controlled manner to a braking pressure control line 5. Consequently, an analog driver braking pressure p1 is applied to the braking pressure control line 5 by means of the brake valve 3 in dependence upon the actuation of the brake pedal 2. The analog driver braking pressure p1 is supplied to the braking circuit 22 in accordance with the illustrated embodiment via a connecting valve 10 that is open in the starting position and that in this case is configured as a single connecting valve 10 and indeed as a 3/2 way solenoid valve. The connecting valve 10 is used to selectively connect a driver assist function in dependence upon an external braking request signal XBR or for example an internal braking request signal RSC as is described further below.

An ABS valve device 13 having an ABS inlet valve 11 and an ABS outlet valve 12 is provided in the braking circuit 22, and a brake line 16 leading to a wheel brake 14 that is provided on a vehicle wheel 15 is subsequently connected to said ABS valve device.

A brake control device 8 (ABS control device) receives wheel rotational speed signals n of the wheel rotational speed sensors 17 that are provided on the vehicle wheels 15 and outputs control signals S2 and S3 as ABS control signals to the ABS valve device 13 for a brake slip regulating procedure, with the known phases, to maintain, to reduce or to increase the braking pressure p16 in the brake line 16, in such a manner as is already known.

The brake valve 3 consequently comprises the braking pressure control line 5 as a pneumatic output duct, furthermore the brake valve 3 comprises as an electrical output duct a sensor desired signal S1 that is output by the brake valve 3 to the brake control device 8. For this purpose the brake valve 3 in accordance with the detailed enlargement of FIG. 2 comprises an actuating rod 6 as an actuating element or actuating member that may be adjusted by the brake pedal 2 by an adjustment travel sw, and for example a throughflow cross section 33 of the brake valve 3 is set—in a manner known per se—by means of said actuating rod so as to output the analog driver braking pressure p1 to the braking pressure control line 5. A travel sensor 18, for example a Hall sensor, is arranged on the actuating rod 6 so as to sense the adjustment travel sw.

The travel sensor 18 generates an actuating signal S5 in dependence upon the adjustment travel sw and outputs said actuating signal to a determining device 20 that forms the sensor desired signal S1 on the basis of a characteristic curve KL from the actuating signal S5, said characteristic curve being stored in a storage device 21 of the brake valve 3, and said sensor desired signal is designed for example as a PWM signal or data content on a CAN bus and is output to the brake control device 8.

The brake control device 8 determines the driver braking pressure p1 directly from the sensor desired signal S1.

The driver braking pressure p1 may be guided directly to the wheel brake 14 in the case of an open connecting valve 10 and open inlet valve 11 of the ABS valve device 13. Furthermore, in a manner that is not illustrated here but is known, additional valve devices may be provided for example for an axle load distribution (ALB valve device).

An external braking request signal XBR may be output by an external driver assist control device 30 to the brake control device 8 for example via the CAN bus, whereupon said brake control device 8 outputs a connecting signal S4 for switching the connecting valve 10 that for example connects the compressed air reservoir 4 or also another compressed air reservoir having the system pressure p0 via a supply line 29 to the braking circuit 22 having the ABS valve device 13. The brake control device 8 pulses the ABS valve device 13 via the control signals S2, S3 in such a manner that from the system pressure p0 the analog operating braking pressure p16 that is to be set for the driver assist function is set in the brake line 16 to the wheel brake 14.

A precise knowledge of the analog driver braking pressure p1 that is provided in a controlled manner by the driver in the brake control line 5 is in particular important for the ABS regulating procedure but also for the introduction of such a driver-independent external (XBR) or driver-independent internal (RSC) braking procedure since the brake system already draws on a relationship between pressure control and vehicle reaction (deceleration) when braking so as to achieve a precise implementation of the braking request, which may be derived from driver braking procedures and furthermore is connected to the connecting valve 10 between the driver braking pressure p1 and the system pressure p0 and therefore considerable pressure differences may be present. The brake control device 8 should therefore take into account the prevailing driver braking pressure p1 since otherwise during the switching procedure sudden engagements of the brake may occur that may lead to instability of the vehicle 7. For this purpose, the brake control device 8 receives the sensor desired signal S1 from the brake valve 3.

The procedure of determining and processing the actuating signal S5 to the sensor desired signal S1 and the use in the brake control device 8 is explained below in detail with reference to the diagrams of FIGS. 3, 4 and 5 in which in each case characteristic curves are illustrated of two fundamentally constructively identical, however owing to production-dependent tolerances slightly different, brake valves 3, in other words a first brake valve 3-I and a second brake valve 3-II; the respective characteristic curves are accordingly labeled -I and -II.

Figure 3:
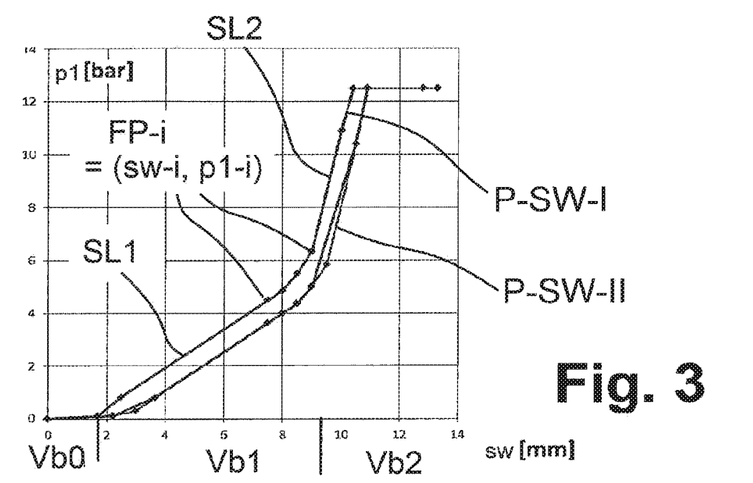
FIG. 3 illustrates a diagram of the braking pressure that is provided in a controlled manner by the two brake valves of the same construction type in the brake system in FIG. 1 in dependence upon an actuating travel of the brake pedal.

The driver braking pressure p1 is illustrated in FIG. 3, by way of example in bar, with respect to the adjustment travel sw, for example in mm, that is indicated by means of the actuating signal S5. A pressure-travel characteristic curve P-SW is provided that is illustrated for the two brake valves as P-SW-I and P-SW-II.

A valve flap is actuated in the brake valve 3 by means of the actuating rod 6 for example via a spring device 32 having two springs 32a, 32b having different resilient characteristics so as to open the throughflow cross section. An opening characteristic is set as a so-called "feeling curve" by means of this specific spring embodiment, wherein small actuations and consequently adjustment travels sw in a starting adjusting range Vb0 from sw0-sw1 initially still do not lead to the valve flap opening, in other words a driver braking pressure p1=0 prevails. In a subsequent first adjusting range Vb1, a first spring rigidity of the first spring 32a becomes relevant as for example a relatively gradual first gradient SL1 and subsequently in a second adjusting range Vb2 from sw1 to sw2 a second spring rigidity SL2 of the second spring 32b becomes relevant as a second gradient.

Consequently, initially a gradual increase in pressure and then in the case of a more intense actuation a more noticeable increase in pressure is rendered possible. Such feeling curves are perceived as pleasant for a driver.

Fixed points Fp-i wherein i=1, 2, 3, . . . are provided as value pairs from a pressure value p1 and a value of the adjustment travel sw so as to define the pressure travel characteristic curves P-SW that are illustrated in FIG. 3 and the curve is then interpolated between said fixed points. The fixed points Fp-i are used for the purpose of setting characteristic ranges of the characteristic curve.

The fixed point Fp-1 is initially at sw=0 and consequently p1=0 corresponding to the brake pedal not having been actuated.

The subsequent fixed point Fp-2 may be present for example in the case of an actuating travel sw-2 in which a first pressure increase occurs, wherein for example a pressure of p1 smaller than/equal to 0.1 bar prevails. At point Fp-3 having for example an adjustment travel sw-3, a pressure of p1=0.8 bar for example prevails; subsequently during the transition of the linear sections of the spring characteristic curves multiple fixed points are set, with the result that the pressure travel characteristic curve P-SW is formed by means of a linear course or distance course of multiple sections, wherein for example in this case a relatively long straight section is set between Fp-2 and Fp-3, subsequently a transition and between Fp-6 and Fp-7 a further straight section of the second spring is set. In the case of Fp-9, a full brake actuation is already achieved, with the result that the further actuation at Fp-10 does not lead to a further increase of the driver braking pressure p1. In the case of Fp-10, a maximum actuation of the brake pedal 2 is achieved, in other words the brake pedal 2 is fully actuated.

The pressure-travel characteristic curve KL may consequently be defined for example as a tuple of fixed points Fp-i, that are in each case defined as value pairs (p, sw).

Figure 4:
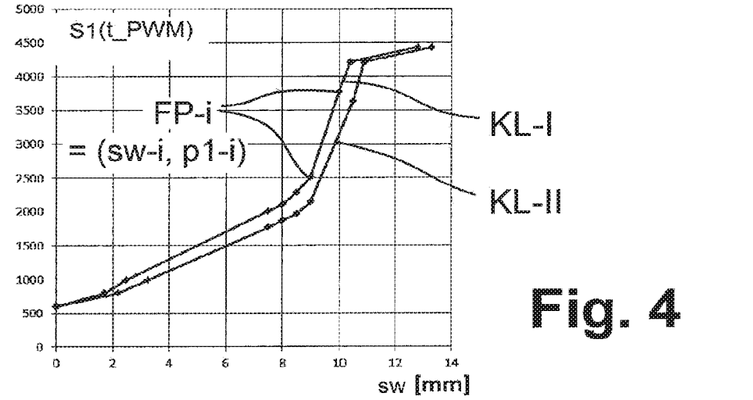
FIG. 4 illustrates diagrams of the electrical output signals of the two brake valves in dependence upon the actuating travel.

FIG. 4 illustrates the valve characteristic curve KL that is drawn upon by the determining device 20, in other words in turn the two valve characteristic curves KL-I and KL-II for the two constructively identical brake valves 3. The valve characteristic curve KL may be stored in the storage device 21; essentially however the pressure-travel characteristic curve P-SW may also be stored in the storage device 21, with the result that the determining device 20 determines the sensor desired signal S1 on the basis of said pressure-travel characteristic curve; is relevant that the determining device 20 generates and outputs the sensor desired signal S1.

In accordance with FIG. 4, a dependency upon the adjustment travel sw that is illustrated by means of the actuating signal S5 is consequently also determined for the sensor desired signal S1 that is output as a PWM signal having a signal width t_PWM or via a CAN bus, said adjustment travel representing the valve characteristic curve KL. The valve characteristic curve KL may consequently be stored in the storage device 21.

Consequently, in the case of an actuation of the brake pedal 2, an actuating signal S5 is initially generated in the brake valve 3 by the travel sensor 18 and the sensor desired signal S1 is determined from said actuating signal by the determining device 20 on the basis of the stored characteristic curve KL (or P-SW) and is output to the brake control device 8.

Figure 5:
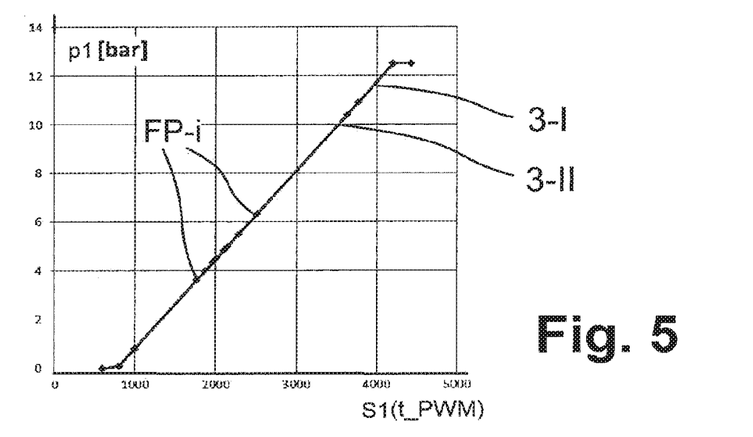
FIG. 5 illustrates a diagram showing the dependencies of the braking pressure that are derived from FIGS. 2 and 3 upon the electrical sensor signals of the two brake valves in FIGS. 2 and 3.

In accordance with FIG. 5, the sensor desired signal S1 illustrates for the two brake valves 3-I and 3-II a linear dependency, wherein the functions p1(S1) according to FIG. 5 also correspond, in other words are identical even if the fixed points of the characteristic curves P-SW-I, P-SW-II and accordingly KL-I and KL-II are different. Consequently, a uniform, identical sensor desired signal S1 may be used by means of the brake control device 8 for each brake valve 3 that is used; the specific tolerances and disparities may consequently already be taken into account and compensated in accordance with the invention in the brake valve 3 by means of the stored characteristic curves. A replacement of a brake valve 3—without reprogramming the brake control device 8—also does not lead to a change in the brake behavior.

Figure 6:
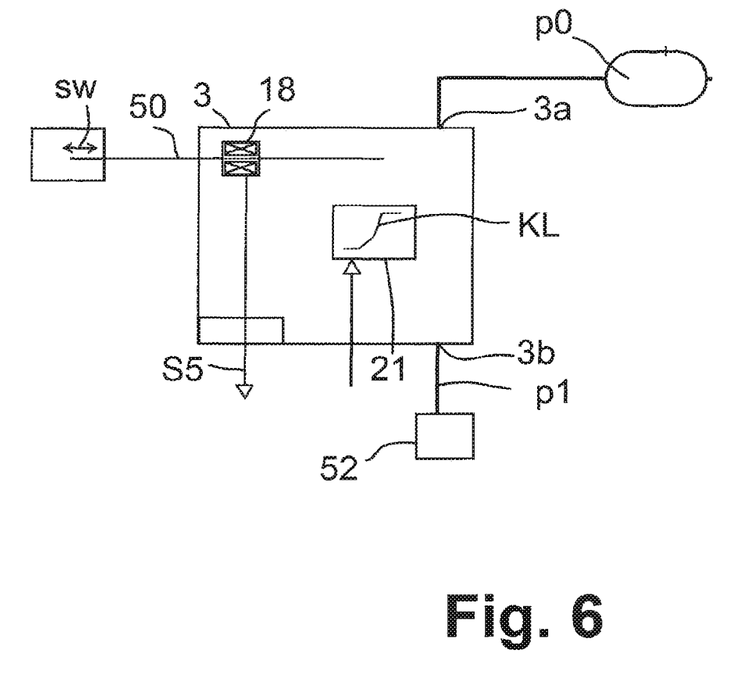
FIG. 6 illustrates an arrangement for calibrating a brake valve in FIG. 2.

The characteristic curve KL or P-SW is determined in accordance with FIG. 6 in a calibrating procedure or calibrating method that is already performed in the production of the brake valve 3, in particular end of line in the case of a final testing procedure. During the final testing procedure, the brake valves 3 are initially subjected in a conventional manner to a test for tightness etc. which is why in accordance with FIG. 6 said brake valves is connected using its compressed air input 3a to a reservoir pressure p0 and a pressure sensor 52 is connected to the compressed air output 3b of said brake valve. Furthermore, an actuator 50 corresponding to the actuating rod 6 is used for calibration purposes said actuator being adjusted in a defined manner, wherein the actuating signal S5 that is generated by the travel sensor 18 is received. The adjustment travel sw of the actuating signal S5 passes through the fixed points Fp1 to Fp10 of FIG. 1 and said fixing points are measured by means of the pressure sensor 52 of the driver braking pressure p1 that is transmitted in a controlled manner.

Consequently, the pressure-travel characteristic curve P-SW or the brake valve characteristic curve KL may be determined directly and may be stored in the storage device 21 in a non-volatile manner. As a consequence, a pressure-oriented calibration is performed.

In accordance with a further development, two travel sensors 18 may be provided in a brake valve 3 in order to generate a redundancy. Consequently, the FIGS. 3, 4, 5 may also be evaluated to the effect that the two pressure-travel characteristic curves P-SW-I, P-SW-II or the two brake valve characteristic curves KL-I and KL-II in each case represent two identically calibrated travel sensors 18-I and 18-II that are provided in a single brake valve 3 and in accordance with FIG. 5 provide a redundancy, in other words identical measurement results. The two travel sensors 18-I and 18-II may be measured simultaneously or in parallel in the calibrating procedure, with the result that it is also ensured that the characteristic curves of said travel sensors are calibrated in the case of precisely identical pressure values of the driver braking pressure p1 that is to be output later.

Figure 7:
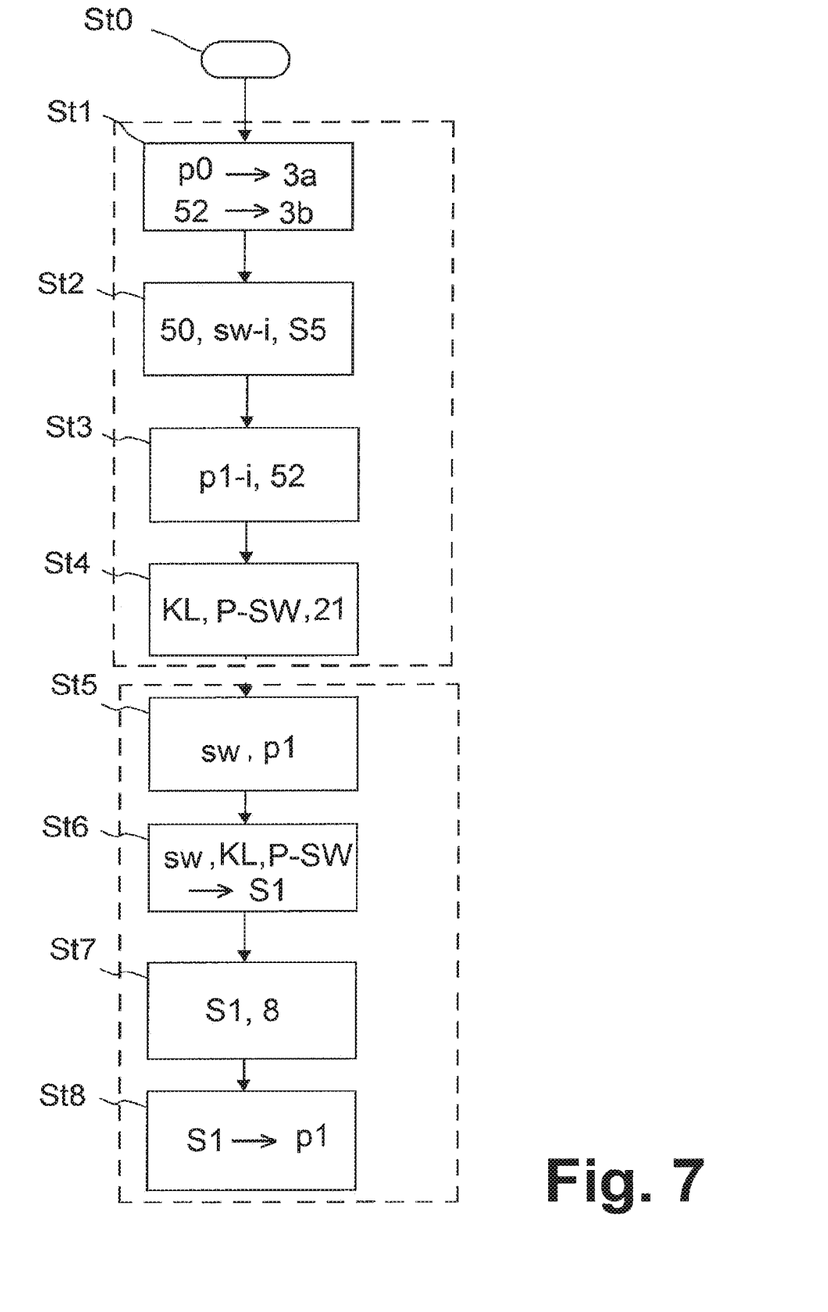
FIG. 7 illustrates a flow diagram of a calibrating method in accordance with an embodiment of the invention.

Consequently, in the production procedure of FIG. 7, after the start in step St0, subsequently in accordance with step St1 the reservoir 4 or a system pressure p0 is connected to the compressed air input 3a, and the pressure sensor 52 is connected to the compressed air output 3b; this step may be part of the preceding tightness test.

In step St2, the actuator 50 is subsequently activated and different adjustment travels sw are set that are measured respectively as an actuating signal S5, the fixed points Fp1-Fp10 are accordingly successively adjusted. In step St3, consequently—simultaneously with the step St2, respectively in the set adjustment travels sw-1 to sw-10 the respective pressure value p1-1 to p1-10 is measured by the pressure sensor 52, wherein a measuring device control device receives these measured values and subsequently in step St4 forms the characteristic curve KL or P-SW for example as a value tuple of the fixed points Fp-i and is stored in the storage device 21.

The calibrating procedure is consequently performed once in step St1 to St4 during production and on calibration of the brake valve 3. The calibrating procedure may essentially be restarted afterward however this is not necessary. After production during operation in the case of an actuation of the brake pedal 2 consequently in accordance with step St5 on the one hand the analog driver braking pressure p1 is controlled and furthermore an adjustment travel sw is determined as actuating signal S5, in accordance with step St6 the sensor desired signal S1 is determined by the determining device 20 owing to the characteristic curve KL or P-SW and the adjustment travel sw, in step St7 the sensor desired signal S1 is output to the brake control device 8, wherein the brake control device 8 subsequently in step St8 may take and draw upon the driver braking pressure p1 directly and in a linear manner from the sensor desired signal S1 and so as to output the control signals S2, S3 and where appropriate S4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Compressed air brake system
2 Brake pedal
3 Driver brake valve
3a Compressed air input
3b Compressed air output
4 First compressed air reservoir
5 Braking pressure control line
6 Actuating rod of the brake pedal 2
7 Vehicle, in particular commercial vehicle
8 Brake control device (control device of the brake system)
10 Connecting valve
11, 12 ABS blocking valve
11 ABS inlet valve
12 ABS outlet valve
13 ABS valve device having ABS inlet valve 11 and ABS outlet valve 12
14 Wheel brake
15 Vehicle wheel
16 Brake line
17 Wheel rotational speed sensor
18 Travel sensor
20 Determining device
21 Characteristic curve storage device
22 Braking circuit
28 Relay valve
29 Supply line
30 External driver assist control device
32 Spring device in the driver brake valve 3
32a First spring
32b Second spring
33 Throughflow cross section
50 Actuator
52 Pressure sensor
n Wheel rotational speed signal
p0 System pressure
p1 Analog driver braking pressure in the brake control line 5
p1-i Driver braking pressure values
p16 Analog operating braking pressure in the brake line 16
S1 Sensor desired signal
S2, S3 Control signals to the ABS blocking valves 11, 12
S4 Connecting signal
S5 Actuating signal
sw Adjustment travel
sw-i Adjustment travel values Fp-i Fixed points as a tuple of numbers from sw-i, p1-*i*
P-SW Pressure-travel characteristic curve
P-SW-I First pressure-travel characteristic curve
P-SW-II Second pressure-travel characteristic curve
KL Brake valve characteristic curve
KL-I First brake valve characteristic curve
K1-II Second brake valve characteristic curve
Vb0 Start adjusting region
Vb1 First adjusting region
Vb2 Second adjusting region
SL1 First spring rigidity as a first increase
SL2 Second spring rigidity as a second increase
PWM Pulse width modulation
XBR External braking request (eXternal Brake Request)
RSC Driver-independent internal braking request signal (Roll Stability Control)
St0-St8 Steps of the method
St1-St4 Steps of the calibrating method
St5-St8 Steps of the braking method

The invention claimed is:

1. A driver brake valve for a compressed air brake system of a commercial vehicle, wherein the driver brake valve is configured to be controlled by a brake pedal and is further configured to output an analog driver braking pressure and an electrical sensor desired signal in dependence upon the actuation of the brake pedal, the driver brake valve comprising:
   a compressed air input configured to connect to a system pressure;
   a compressed air output configured to connect to a brake control line;
   a sensor configured to determine an actuation of the brake pedal;
   a characteristic curve storage device configured to store characteristic curve data; and
   a determining device;
   wherein the sensor is configured to generate an actuating signal in dependence upon the actuation of the brake pedal,
   wherein the determining device is configured to generate a sensor desired signal from the actuating signal in dependence upon the characteristic curve data, and
   wherein the characteristic curve data are formed by calibrating the brake valve and measuring the driver braking pressure that is output.

2. The driver brake valve as claimed in claim 1, wherein the characteristic curve data and/or the sensor desired signal include a non-linear relationship of a driver braking pressure that is provided in a controlled manner and/or signal value of an adjustment travel of the brake pedal.

3. The driver brake valve as claimed in claim 1, wherein the determining device is configured so as to generate and output the sensor desired signal as a linear dependency of the driver braking pressure upon the adjustment travel.

4. The driver brake valve as claimed in claim 1, wherein the sensor desired signal reproduces a dependency of the driver braking pressure that is output by the brake valve upon the adjustment travel of the brake pedal.

5. The driver brake valve as claimed in claim 1, wherein the sensor desired signal is a PWM signal, wherein a pulse width of the PWM signal is proportional to the driver braking pressure that is provided in a controlled manner.

6. The driver brake valve as claimed in claim 1, wherein the characteristic curve data include at least two linear regions having different gradients that are allocated to the spring rigidities of the two springs of a spring device of the driver brake valve or of the brake pedal or simulate a non-linear spring characteristic curve in sections in a linear manner.

7. The driver brake valve as claimed in claim 1, wherein the characteristic curve data comprises fixed points as value tuples so as to interpolate the characteristic curve and/or so as to interpolate fixed points.

8. The driver brake valve as claimed in claim 1, wherein the sensor is a travel sensor for determining an adjustment travel of an actuating device that is connected to the brake pedal or is activated using the brake pedal so as to set a throughflow cross section of the driver brake valve.

9. A compressed air brake system for a commercial vehicle comprising:
   a brake pedal;
   a driver brake valve as claimed in claim 1, the drive brake valve being configured to be controlled by the brake pedal;
   at least one braking circuit having at least one wheel brake and a blocking valve device;
   a braking pressure control line for conducting or guiding the analog driver braking pressure to the braking circuit; and
   a brake control device for receiving the sensor desired signal and outputting control signals.

10. The compressed air brake system as claimed in claim 9, wherein a connecting device is provided between the braking pressure control line and the braking circuit, the connecting device alternatively connecting the braking pressure control line or a system pressure to the braking circuit,
   wherein the connecting device is configured to be controlled by a connecting signal from the brake control device in dependence upon an external or internal braking request signal that is independent of the driver.

11. A method for producing a driver brake valve as claimed in claim 1, the method comprising:
   connecting a system pressure to a compressed air input of the driver brake valve and a compressed air sensor to a compressed air output of the driver brake valve;
   gradually adjusting an actuator and measuring by the pressure sensor on the one hand the multiple adjusting values of the adjustment travel as actuating signals of the sensor and on the other hand measuring the driver braking pressure values of the driver braking pressure, the values being output by the driver brake valve in the case of the adjusting values of the adjustment travel to the compressed air outlet; and
   forming a characteristic curve from the adjusting values and pressure values and storing the characteristic curve in the characteristic curve storage device of the brake valve.

12. The method as claimed in claim 11, wherein the characteristic curve is stored as fixed points that are formed as or from value tuples of the adjusting values of the adjustment travel and the driver braking pressure values of the driver braking pressure.

13. The method as claimed in claim 11, wherein a system pressure is connected to the compressed air input of the driver brake valve and the compressed air sensor is connected to a compressed air output of the driver brake valve prior to or as part of testing the tightness after producing the driver brake valve; and
   wherein the gradually adjusting an actuator, the measuring by the pressure sensor the multiple adjusting values, and the forming and storing the characteristic curve in the characteristic curve storage device of the brake valve are subsequently performed.

14. A driver brake valve for a compressed air brake system of a commercial vehicle, wherein the driver brake valve is configured to be controlled by a brake pedal and is further configured to output an analog driver braking pressure and an electrical sensor desired signal in dependence upon the actuation of the brake pedal, the driver brake valve comprising:
 a compressed air input configured to connect to a system pressure;
 a compressed air output configured to connect to a brake control line;
 a sensor configured to determine an actuation of the brake pedal;
 a characteristic curve storage device configured to store characteristic curve data; and
 a determining device;
 wherein the sensor is configured to generate an actuating signal in dependence upon the actuation of the brake pedal,
 wherein the determining device is configured to generate a sensor desired signal from the actuating signal in dependence upon the characteristic curve data, and
 wherein the determining device is configured so as to generate and output the sensor desired signal as a linear dependency of the driver braking pressure upon the adjustment travel.

15. The driver brake valve as claimed in claim 14, wherein the characteristic curve data are formed by calibrating the brake valve and measuring the driver braking pressure that is output.

16. The driver brake valve as claimed in claim 14, wherein the sensor desired signal is a PWM signal, wherein a pulse width of the PWM signal is proportional to the driver braking pressure that is provided in a controlled manner.

17. A driver brake valve for a compressed air brake system of a commercial vehicle, wherein the driver brake valve is configured to be controlled by a brake pedal and is further configured to output an analog driver braking pressure and an electrical sensor desired signal in dependence upon the actuation of the brake pedal, the driver brake valve comprising:
 a compressed air input configured to connect to a system pressure;
 a compressed air output configured to connect to a brake control line;
 a sensor configured to determine an actuation of the brake pedal;
 a characteristic curve storage device configured to store characteristic curve data; and
 a determining device;
 wherein the sensor is configured to generate an actuating signal in dependence upon the actuation of the brake pedal,
 wherein the determining device is configured to generate a sensor desired signal from the actuating signal in dependence upon the characteristic curve data, and
 wherein the characteristic curve data include at least two linear regions having different gradients that are allocated to the spring rigidities of the two springs of a spring device of the driver brake valve or of the brake pedal or simulate a non-linear spring characteristic curve in sections in a linear manner.

18. The driver brake valve as claimed in claim 17, wherein the characteristic curve data are formed by calibrating the brake valve and measuring the driver braking pressure that is output.

19. The driver brake valve as claimed in claim 17, wherein the sensor desired signal is a PWM signal, wherein a pulse width of the PWM signal is proportional to the driver braking pressure that is provided in a controlled manner.

20. The driver brake valve as claimed in claim 17, wherein the determining device is configured so as to generate and output the sensor desired signal as a linear dependency of the driver braking pressure upon the adjustment travel.

* * * * *